SUBSCRIBER COMMUNICATION SYSTEM

Filed Jan. 3, 1966 2 Sheets-Sheet 1

INVENTOR.
Charles F. Hepner
BY James E. Tracy
Attorney

SUBSCRIBER COMMUNICATION SYSTEM

Filed Jan. 3, 1966 2 Sheets-Sheet 2

INVENTOR.
Charles F. Hepner
BY James E. Tracy
Attorney

United States Patent Office 3,538,242
Patented Nov. 3, 1970

3,538,242
SUBSCRIBER COMMUNICATION SYSTEM

Charles F. Hepner, Chicago, Ill., assignor to Zenith Radio Corporation, Chicago, Ill., a corporation of Delaware Filed Jan. 3, 1966, Ser. No. 518,191
Int. Cl. H04n 1/32
U.S. Cl. 178—5.1 12 Claims

ABSTRACT OF THE DISCLOSURE

As a prerequisite to the utilization of a received intelligence signal in a subscriber receiver, an adjustable apparatus must be positioned by the subscriber to a predetermined required adjustment. Correlation testing circuitry performs a series of time spaced correlation tests to determine if the adjustable apparatus has in fact been properly positioned to the required adjustment. When a number of such tests indicate a condition of correct correlation between the required adjustment and the actual adjustment of the apparatus at the time, enabling circuitry is rendered operable to enable the receiver to utilize (i.e., intelligibly reproduce) the intelligence signal. In addition, after it has been positively established that correct correlation prevails, the correlation testing circuitry is effectively made inoperative to immunize the receiver against noise, airplane flutter, etc., which may otherwise cause the testing circuitry to disable the receiver.

Figure 1:
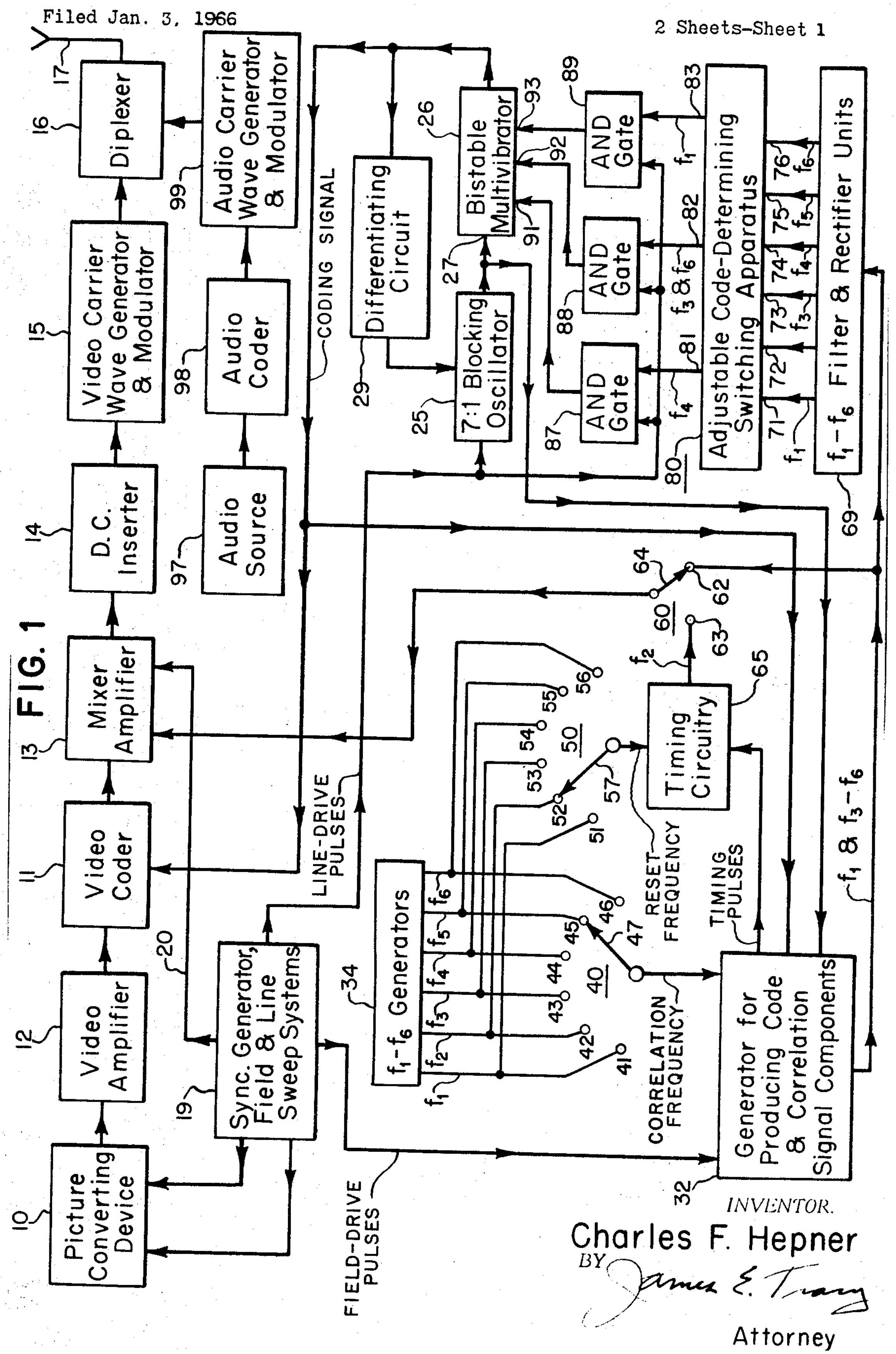

This invention relates to a subscriber communication system having a receiver of the type including an adjustable apparatus which must be adjusted in a particular prescribed manner before a received signal may be intelligibly reproduced. The invention is especially useful when incorporated in a subscription television system, such as that disclosed in copending application Ser. No. 169,812, filed Jan. 30, 1962, and issued Apr. 5, 1966 as Pat. No. 3,244,806, in the name of George V. Morris, and assigned to the present assignee, and for that reason will be described in such an environment.

In the system disclosed in the Morris application there is an adjustable switching apparatus having a multiplicity of different conditions of adjustment or switch positions. The subscriber is obliged to establish the apparatus in a predetermined condition of adjustment for each subscription television program, which condition is preferably different for each program. A correlation testing arrangement is provided to effectively examine the actual adjustment of the switching apparatus to determine if it is appropriately positioned for any given program, in which case the coded television signal for that program is decoded and intelligibly reproduced.

More specifically, in order to make a positive determination that the adjustable switching apparatus has in fact been properly set by the subscriber, the correlation testing arrangement in Morris conducts a separate correlation test during each field-retrace interval, and a series of such tests must indicate correct adjustment before the coded television signal is intelligibly reproduced. Decoding is achieved by means of a decoding signal developed in the receiver and having a waveshape that is influenced by the particular adjustment of the switching apparatus at the time. A correlation signal component, transmitted to the receiver during each field-retrace interval, is compared with the decoding signal. If the receiver switching apparatus is properly positioned, the timing of each correlation component will exhibit a predetermined relation with respect to the decoding signal and provide an indication of correct correlation in the form of a single control pulse. Enabling circuitry for the receiver becomes operable, thereby to effect intelligible reproduction of the television signal, in response to an uninterrupted series of these control pulses throughout a relatively long testing period or interval, for example of ten seconds duration. A single test failure during the ten-second testing period prevents enabling of the receiver and initiates another testing period.

After correct correlation has been positively confirmed by a ten-second testing period, periodic correlation tests (one each field retrace) are still made in Morris and the receiver remains enabled in response to the test results indicating correct correlation. However, the enabling circuitry is held in its operable condition in order that a failure of any one or even several consecutive ones of these tests will not result in disabling of the receiver. This feature is accomplished by circuitry which becomes effective only after a ten-second testing period has conclusively established that the receiver is appropriately set up. This insures that momentary interruptions or disturbances of the transmitted signal, as a result of impulse noise, airplane flutter, etc., which would ordinarily provide an indication of incorrect correlation, will not cause any loss of video and sound after the initial ten-second testing period has been completed and a correct setting of the subscriber's adjustable code-determining switching apparatus has been positively confirmed. Sustained airplane flutter or signal fade-out for any reason for a substantial time interval may, however, result in indications of incorrect correlation in Morris for an interval sufficiently long that the enabling circuitry becomes inoperable, causing a loss of video and sound. Enabling of the receiver would then not take place again until subsequent to another ten-second testing period in which all of the correlation tests during that period reflect correct correlation.

The present invention, in accordance with one of its aspects, constitutes an improvement over the system shown in the copending Morris application, Ser. No. 169,812, in that once correct correlation has been verified by means of a series of correlation test the receiver is enabled, and any subsequent test failures have no effect whatever. The receiver of the present application remains enabled to achieve utilization of the television signal no matter how many successive test failures occur.

It is, therefore, an object of the present invention to provide a new subscriber communication receiver.

It is another object to provide an improved subscriber communication receiver employing the correlation testing principle.

It is still another object of the invention to provide a novel subscription television receiver to which is transmitted a coded television signal A subscriber communication receiver for utilizing a received intelligence signal, and constructed in accordance with one aspect of the invention, comprises an adjustable apparatus to be established in a predetermined condition of adjustment to effect utilization of the intelligence signal. There is a multicondition mechanism having set and reset operating conditions. Correlation testing means, couple to the adjustable apparatus and to the multicondition mechanism, performs a series of time spaced correlation tests to determine if the apparatus has in fact been properly positioned to the predetermined condition of adjustment and actuates the multicondition mechanism, responsive to each correlation test which indicates correct correlation between the predetermined condition of adjustment and the actual condition of the apparatus at the time, to its set condition in the event the mechanism is not already established therein. Reset means are provided for actuating the multicondition mechanism, during each of a series of time spaced intervals intervening the series of correlation tests, to its reset condition in the event the mechanism is not alreday established therein. The receiver also includes control means, coupled to the correlation testing means and operable after a number of the tests have indicated correct correlation, for effectively disabling the reset means top revent resetting of the multicondition mechanism by the reset means.

In accordance with another aspect of the invention, an arrangement is provided for remotely controlling the receiver from the transmitter. A receiver, constructed according to this aspect, comprises an adjustable apparatus to be established by the subscriber in a predetermined condition of adjustment. There is a multistable mechanism having set and reset stable operating conditions and which must be established and substantially remain in its set condition to effect utilization of the intelligence signal. Means at least partially responsive to the establishment of the apparatus in the predetermined condition of adjustment actuates the multistable mechanism to its set condition and reains the mechanism substantially in that set condition thereby to enable the receiver to utilize the intelligence signal. Means, adapted to be remotely controlled from the transmiter, are provided for resetting the multistable mechanism to its reset condition.

Figure 2:
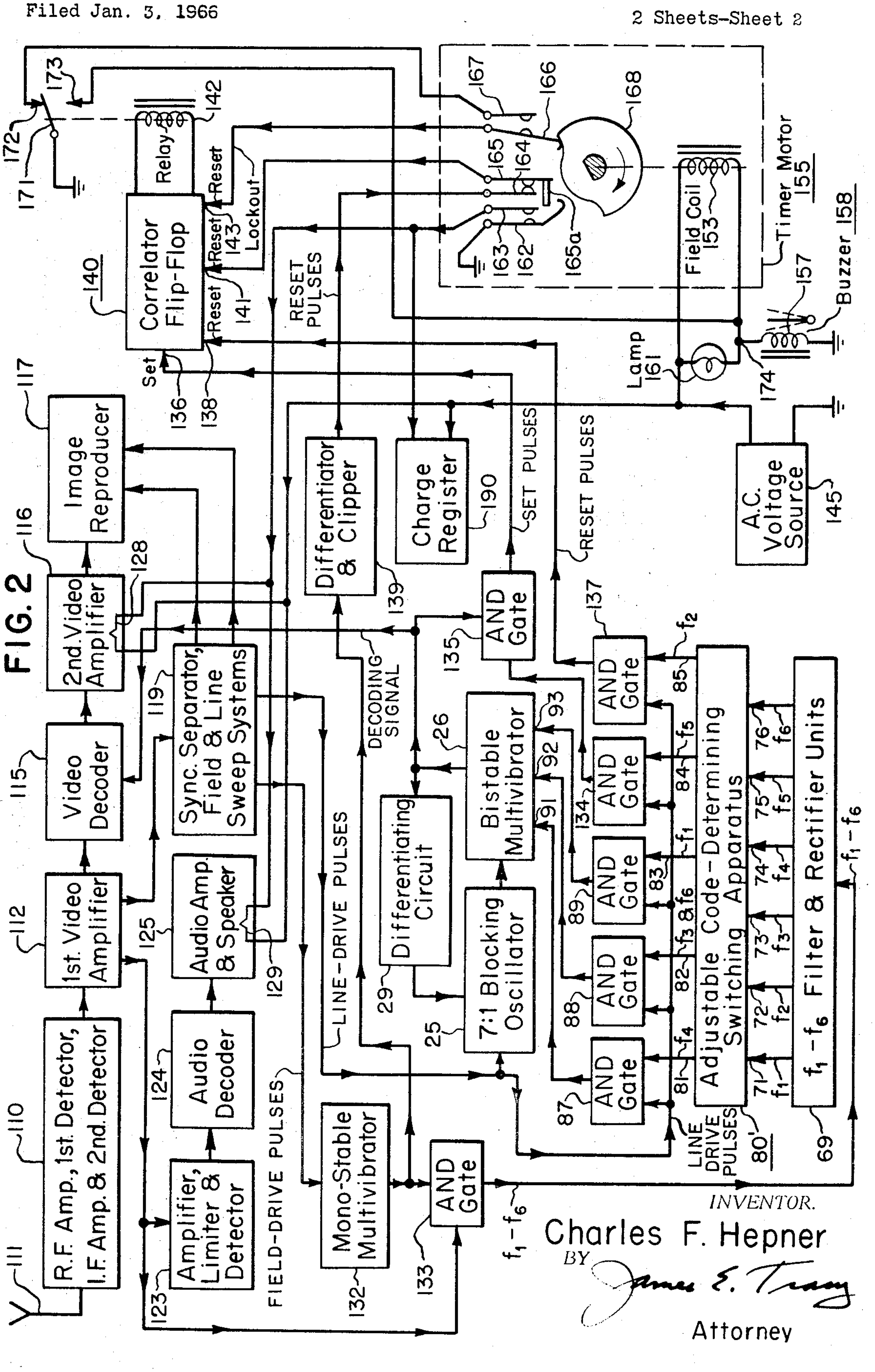

The features of the invention which are believed to be new are set forth with particularity in the appended claims. The invention, together with further objects and advantages thereof, may best be understood, however, by reference to the following description in conjunction with the accompanying drawings in which:

FIG. 1 is a block diagram representation of a subscriber communication transmitter, specifically a subscription television transmitter; and FIG. 2 schematically illustrates in block diagram form a subscriber communication receiver, specifically a subscription television receiver, constructed in accordance with one embodiment of the invention and arranged to utilize the coded television signal transmitted from the transmitter of FIG. 1

The illustrated arrangement of the present application is a modification of that shown in the Morris application, Ser. No. 169,812. Many of the circuits shown here in block diagram form are illustrated and described in greater detail in the Morris case, in Pat. No. 3,081,377, issued Mar. 12, 1963 to Norman T. Watters, assigned to the present assignee, and in several other patents referred to in the Watters case. Reference, of course, may be made to these patent disclosures for details of the transmitter and receiver. The expedient of block diagram illustration has been employed in the present application in the interest of simplification and in order to pinpoint clearly the invention.

Considering now the structure of the transmitter of FIG. 1, a picture converting device 10 is provided which may take the form of a conventional camera tube for developing a video signal representing an image to be televised. A video coding device 11 is connected to the output terminals of camera tube 10 through a video amplifier 12. Coder 11, which includes a time delay network and an electronic switch having two operating conditions, is interposed in the video channel to vary the mode of operation and accomplish coding of the video signal. In one operating condition, coder 11 switches the time delay network functionally into the video channel to delay the video with respect to the sync information thereby to establish one operating mode of the system. In its other operating condition, the delay network is removed from the video channel so that the video signal is translated through the coder without the introduction of any significant time delay thereby to establish a distinctly different operating mode. Video coder 11 is actuated from one to the other of its two conditions, thereby to effect mode changes, in response to an applied rectangular shaped coding signal developed in a manner to be explained.

The output of coder 11 is coupled to one pair of input terminals of a mixer amplifier 13, which in turn is connected through a direct current inserter 14 to a video carrier wave generator and modulator 15 having output terminals connected through a diplexer 16 to a transmitting antenna 17. A synchronizing signal generator supplies field- and line-drive pulses to a field-sweep system and to a line-sweep system, respectively. For convenience, the sync generator and the field- and line-sweep systems have been shown by a single block designated by the numeral 19. The output terminals of the sweep systems are connected to the field- and line-deflection elements (not shown) associated with picture converting device 10. The synchronizing signal generator of unit 19 supplies the usual field- and line-synchronizing components and associated blanking pedestal components to mixer amplifier 13 over suitable circuit connections, here schematically illustrated as a single conductor 20.

The sync generator additionally supplies line-drive pulses to one input of a conventional 7:1 step-down blocking oscillator 25 which has its output terminals connected to an input circuit 276 of a bistable multivibrator or flip-flop 26 which may be of conventional construction. Input 27 is a counting input since it is connected to multivibrator 26 in such a way that each pulse translated thereto from blocking oscillator 25 always triggers the multivibrator from its instantaneous stable condition, whatever one that may be, to its opposite stable condition. The output terminals of multivibrator 26 connect to an input of video coder 11. The cascade arrangement of oscillator 25 and flip-flop 26 realizes a total countdown ratio of 14:1; hence, the multivibrator output signal exhibits a rectangular wave shape having amplitude changes every seven line or horizontal traces. This signal constitutes the coding signal and effects periodic actuation of video coder 11 between its two operating conditions and interposes the time delay network in the video channel during alternate groups of seven successive line-trace intervals to introduce a time delay between the radiated video and synchronizing components.

To reset blocking oscillator 25 to its reference or zero-count operating step, a feedback circuit, including a differentiating circuit 29, is provided from the output of multivibrator 26 to the reset input of the oscillator. The amplitude excursions of the coding signal developed by multivibrator 26 determine when oscillator 25 is reset.

In order to interrupt the periodic actuation of counting chain 25, 26, random code signal generating apparatus shown by a single block 32 develops during a portion of each field-retrace interval following the occurrence of the field-sync pulse for that interval, a combination of code signal components or bursts individually having a predetermined identifying frequency and collectively representing coding information in accordance with their appearance and order within the combination. Attention is directed to the Watters Pat. No. 3,081,377, and references mentioned therein, for the details of the code signal generating apparatus included in unit 32.

The code signal combination produced during each field-retrace interval may comprise a series of up to ten code signal bursts, each of which may have any one of four different frequencies selected from a group of six frequencies designated $f_1$–$f_6$, and these bursts are randomly sequenced and randomly appearing within the overall code burst interval. The fifth and sixth frequencies, of the group of $f_1$–$f_6$, which are not used as code signal frequencies are devoted to correlation testing and reset purposes respectively as will be explained.

To provide the correlation and reset signal components, a series of $f_1$–$f_6$ generators schematically shown by a single block 34 has a series of six output conductors, labeled $f_1$–$f_6$, each of which delivers a continuous sinusoidal signal of an assigned, respective one of frequencies $f_1$–$f_6$. The $f_1$–$f_6$ outputs of unit 34 are respectively connected to a series of six stationary switch contracts 41–46 of a simple six-position rotary switch 40 and also to a series of six stationary switch contacts 51–56 of a similar six-position rotary switch 50. The rotary switch contact 47 of switch 40 is connected to an input of the signal generating apparatus of unit 32 to supply to unit 32 a continuous signal of the selected correlation frequency. In similar fashion, movable switch contact 57 of switch 50 is connected to an input of a unit 65 designated timing circuitry to deliver thereto a continuous signal of the selected reset frequency.

With this arrangement, a single frequency selected by switch 40 from the group $f_1$–$f_6$ is employed for correlation testing purposes and it is contemplated that this correlation frequency may be changed from program to program. Moreover, another frequency selected by switch 50 from the group $f_1$–$f_6$ is employed to reset circuitry in the receiver in a manner to be explained and this reset frequency may also be changed from program to program. The remaining four frequencies are then used for coding purposes. Suitable and simple adjustments of the apparatus of block 32 may be made by the operator of the subscription television transmitter in order that the frequencies devoted respectively to correlation testing and resetting for a given program are not used for coding. For example, in the illustrative setting of switches 40 and 50 in FIG. 1, frequency $f_5$ has been selected for correlation testing and frequency $f_2$ has been chosen for resetting. Accordingly, the code signal generating apparatus of block 32 will be adjusted by the operator so that only the four frequencies $f_1$, $f_3$, $f_4$ and $f_6$ are devoted to scrambling.

An output circuit of unit 32 provides the combinations of code and correlation signal components collectively exhibiting frequencies $f_1$ and $f_2$–$f_6$ and this output is connected to a stationary contact 62 of a simple two-position switch 60. The movable contact 64 of the switch is connected to an input of mixer 13. Fixed contact 63 is connected to the output of timing circuitry 65, and input of which is connected to an output circuit of unit 32. With switch 60 positioned as shown, contacts 62 and 64 engage and the code and correlation components of frequencies $f_1$ and $f_3$–$f_6$ are supplied to mixer 13 to facilitate their conveyance to subscriber receivers. On the other hand, when movable contact 64 is positioned to engage contact 63 only signal bursts of the reset frequency $f_2$ are transmitted to the receivers.

The output of unit 32, at which the code and correlation signals are produced, is also connected to a series of six filter and rectifier units, conveniently shown in FIG. 1 by a single block 69, respectively selective to assigned ones of the different frequencies $f_1$–$f_6$ to facilitate separation of the code and correlation signal components from one another. Block 69 has six outputs, each of which produces rectified pulses of respective ones of frequencies $f_1$–$f_6$. Since in the particular case illustrated bursts of frequency $f_2$ are used for reset and thus are not applied to the filter and rectifier units, only five of the six outputs of block 69 are labeled with the frequency designations $f_1$ and $f_3$–$f_6$ respectively. Of course, when some other frequency is employed for reset rectified pulses of frequency $f_2$ will be produced at the output of the $f_2$ filter and rectifier unit in block 69.

The six outputs of block 69 are connected to a series of six input conductors 71–76, respectively, of an adjustable code-determining switching or permuting apparatus 80 which has a series of three output conductors 81–83. Switching apparatus 80 establishes different prescribed ones of a multiplicity of different interconnection or permutation patterns between inputs 71–76 and outputs 81–83 depending on the adjustment of the apparatus. This may be achieved by a family of simple switches, the positions of which select the desired permutation pattern between inputs and outputs for a given program. Apparatus 80 may take any of a variety of different forms. For example, the input and output conductors may be interconnected by means of a removable code-bearing element inserted in the switching apparatus and containing a unique arrangement of perforations or electrically conductive circuit paths which are sensed.

Switching apparatus 80, which is preferably adjusted differently for each program, permutes the applied code signal components between its input and output conductors in order that the code bursts developed in unit 32 may be further coded before they are used for coding the video signal. Apparatus 80 is so adjusted for any given program that the correlation and reset frequency components are not channeled to any one of output conductors 81–83. Accordingly, since only frequencies $f_1$, $f_3$, $f_4$ and $f_6$ are used for coding, rectified pulses of only those frequencies appear at the outputs of apparatus 80.

For the particular program under consideration, it is assumed that apparatus 80 has been so positioned that input conductor 74 is connected to output conductor 81, both of input conductors 73 and 76 are connected to output conductor 82, and input conductor 71 is connected to output conductor 83. With that particular condition of adjustment for apparatus 80, rectified pulses of frequency $f_4$ appear on output 81, rectified pulses of frequencies $f_3$ and $f_6$ appear on output 82, and rectified pulses of frequency $f_1$ appear on conductor 83, as indicated by the frequency designation labels attached to those output conductors in the drawing. The correlation and reset frequency components are only required at the receiver, as will be explained, and are not needed in the operation of the transmitter.

The three output conductors 81–83 of switching apparatus 80 are connected to respective ones of a series of three and gates 87–89 which are also supplied with line-drive pulses from the synchronizing signal generator of unit 19. The output circuits of gates 87–89 are connected to input circuits 91–93, respectively, of bistable multivibrator 26. Input 92 is preferably coupled to the counting input of the multivibrator so that each time a pulse is translated thereover multivibrator 26 is triggered from its instantaneous stable condition, whichever one that may be, to its opposite condition in the same manner as if it has been supplied with a pulse from blocking oscillator 25. On the other hand, each pulse applied to input 91 actuates the multivibrator to a predetermined one of its two operating conditions, if it is not already there. Input 93, in response to each pulse applied thereto, triggers multivibrator 26 to the other of its two stable operating conditions, in the event it is not already in that other condition.

As will be seen, circuitry identical to units 25–29 and 69–93 is found in the receiver of FIG. 2 and in order to maintain precise synchronism of operation between such corresponding circuitry, it is essential that the counterpart switching apparatus at the receiver be positioned identically to switching apparatus 80 in the transmitter of FIG. 1. To test for correlation, namely to effectively compare the switch setting pattern at the receiver with respect to that at the transmitter, it is necessary that the timing of the correlation signal components (bursts of frequency $f_5$ in the example illustrated) be tied in or related to the code schedule of the coded video signal, namely the schedule as represented by the amplitude excursions of the coding signal developed in the output of multivibrator 26. As fully explained in the Watters Pat. No. 3,081,377, apparatus in unit 32 controls the timing or occurrence of the correlation signal components in order to facilitate correlation testing in the receiver. To correlate the timing of the correlation components with the code schedule, connections are required from the outputs of multivibrator 2 and blocking oscillator 25 to separate input circuits of the apparatus of unit 32. In addition, a connection is required from the sync generator of unit 19 to another input of unit 32 to supply vertical or field-drive pulses thereto. These three connections are all shown in FIG. 1. With this arrangement, and as will be explained, a single correlation signal component is produced and conveyed to subscriber receivers during each field-retrace interval. It is timed to occur subsequent to the field-synchronizing pulse for the field-retrace interval and during an interval in which multivibrator 26 is established in a predetermined one of its two conditions.

The audio signal portion of the telecast is provided by audio source 97 which may constitute a conventional microphone and audio amplifier. The output of audio source 97 is coupled through an audio coder 98 to the input of an audio carrier wave generator and modulator 99, the output of which is coupled to another input of diplexer 16. Audio coder 98 may take any one of a multiplicity of different forms; the only requirement is that is successfully scrambe the audio intelligence. Coder 98 may, for example, be simply a frequency shift type of coder in which heterodyning techniques are employed to shift the audio information, with an inverted frequency distribution, to a portion of the frequency spectrum where it does not normally reside. Preferably, the audio signal is shifted to a higher portion of the frequency spectrum. Such an audio scrambling function is adequate since it effectively codes a characteristic of the audio signal inasmuch as a normal television receiver would not contain suitable compensating circuitry for reinverting and reshifting the audio signal components frequency-wise.

As will be made apparent, the reset components of frequency $f_2$ are normally not required until the conclusion of the subscription television program under consideration. Therefore, switch 60 will be positioned by the operator as shown (namely with movable contact 64 engaging fixed contact 62) at the beginning and during the entire program. The operation of the transmitter will thus be initially considered with switch 60 adjusted as illustrated. Picture converting device 10 develops a video signal representing the picture information to be televised and, after amplification in amplifier 12, the video signal is translated through video coder 11 to mixer amplifier 13 wherein it is combined with the customary field- and line-synchronizing and blanking pulses from the synchronizing signal generator of unit 19. Mixer 13 thereby develops a composite video signal which is applied through direct current inserter 14 to video carrier wave generator and modulator 15 wherein it is amplitude modulated on a picture carrier for application through diplexer 16 to antenna 17 from which it is radiated to subscriber receivers. The field- and line-sweep systems are synchronized by the field- and linedrive pulses from the sync generator of unit 19 in conventional manner.

Audio source 97 picks up the sound information accompanying the telecast, amplifies and supplies it to audio coder 98 wherein the audio components are shifted in the frequency spectrum, with an inverted frequency distribution, to occupy abnormal positions to achieve sound scrambling. The coded audio signal is frequency modulated on a sound carrier in unit 99, and the modulated sound carrier is supplied through diplexer 16 to antenna 17 for concurrent radiation to subscriber receivers with the video information.

Coding of the video portion of the telecast is achieved by coder 11 under the influence of the rectangular shaped coding signal, developed by blocking oscillator 25 and multivibrator 26, which periodically switches the coder back and forth between its two operating conditions in accordance with the code schedule represented by the amplitude variations of the coding signal, which occur every seven line traces because of the total 14:1 countdown ratio of counting stages 25, 26.

In order to interrupt this periodic mode-changing pattern and increase the complexity of the code schedule, a combination of up to ten code signal components, individually exhibiting any one of the four different code frequencies $f_1$, $f_3$, $f_4$ and $f_6$, is developed in source 32 during each field-retrace interval subsequent to the field-sync for that interval. The code signal bursts are separated from one another and rectified in filter and rectifier units 69 for individual application to input conductors 71, 73, 74 and 76 of code-determining switching apparatus 80. As mentioned previously, this apparatus may establish any one of a multitude of different circuit connections between its input and output conductors so that rectified pulses are supplied, via output conductors 81–83, to AND gates 87–89 with a distribution depending on the instantaneous setting of mechanism 80.

Gates 87–89 also receive line-drive pulses from the sync generator of unit 19 and gate in those of the line-drive pulses that occur in time coincidence with the rectified code signal components to input circuits 91–93 of multivibrator 26 to effect actuation thereof. Since the code signal components of frequencies $f_1$, $f_3$, $f_4$ and $f_6$ are randomly sequenced, the cyclic actuation of the multivibrator, normally taking place in response to pulses from oscillator 25 only, is therefore interrupted. In order to add additional scrambling into the system, the coding signal developed by multivibrator 26 is differentiated in differentiating circuit 29 and the differentiated pulses are fed back to oscillator 25 for resetting purposes. Because of the feedback arrangement, random actuation of multivibrator 26 results in random resetting of oscillator 25. Hence, upon the termination of each combination of code bursts, counting chain 25, 26 is established at a different one of its fourteen operating steps or phase conditions from that in which it would have been established if the periodic actuation had not been interrupted. The rectangular shaped coding signal is therefore effectively phase modulated during field-retrace intervals.

To permit the subscribers to utilize the coded transmission, it is necessary that each combination of code signal components be made known to the subscriber receivers. To that end, the code signal components are applied to mixer 13, via contacts 62 and 64 of switch 60, to be combined with the composite video signal for transmission to the subscriber receivers. To facilitate correlation testing at each receiver, the signal generating apparatus of unit 32 produces correlation signal components of the frequency determined by the setting of switch 40 and having a timing which is correlated or tied in with the amplitude excursions of the coding signal developed by multivibrator 26. Specifically, a single correlation signal burst of frequency $f_5$ is produced during each field-retrace interval and is timed to occur when multivibrator 26 is established in a predetermined one of its two conditions. These correlation signal components are also applied to mixer 13 via switch contacts 62 and 64 and transmitted to the subscriber receivers.

The code bursts developed by unit 32 occur during intervals between the line-synchronizing pulses superimposed on each vertical blanking pedestal (one burst between each successive pair of line syncs) subsequent to the field-synchronizing pulse for that blanking pedestal. A series of timing pulses may be drived from unit 32 representing the timing of the code bursts during each vertical-retrace interval and these pulses are applied to an input of timing circuitry 65. The other input of unit 65 receives a continuous sinusoidal signal, via movable switch contact 57 of switch 50, of the particular frequency selected for reset, which is frequency $f_2$ in the example considered in the present application. Timing circuitry 65 includes appropriate timing and gating circuits so that bursts of signal frequency $f_2$ appear at the output of unit 65 timed to occur between the line syncs during each field-retrace interval. In other words, each burst of frequency $f_2$ occurs between a different successive pair of line syncs during vertical retrace. These $f_2$ reset bursts are, of course, ineffective until contact 64 of switch 60 is positioned by the operator of the subscription television service to engage stationary contact 63, thereby to convey the reset pulses to mixer 13 and thus to the subscriber receivers in place of the code and correlation signal pulses. As will be seen, switch 60 will be so manipulated by the operator at the conclusion of the program under consideration in order to reset or release certain circuitry in each subscriber receiver.

Instead of employing unit 65 and switch 60 to facilitate the transmission of reset signal bursts to the receivers, the operator may merely make appropriate adjustments of apparatus 32 at the termination of the program. Unit 32 contains six separate generators each of which is capable of producing a respective one of frequencies $f_1$–$f_6$. For the example considered, the $f_2$ and $f_5$ generators are effectively disabled during the program so that the code components include only bursts of $f_1$, $f_3$, $f_4$ and $f_6$. Upon the conclusion of the program, all of the generators of unit 32 may be disabled with the exception of the $f_2$ generator which would be rendered operable. In this way, the only signal bursts supplied to mixer 13 would be $f_2$ reset bursts.

The subscriber receiver of FIG. 2 is constructed in accordance with one embodiment of the invention to decode especially the coded television signal developed in and transmitted by the transmitter of FIG. 1. A cascade arrangement of a radio frequency amplifier, a first detector or oscillator-mixer, an intermediate frequency amplifier of one or more stages, and a second detector, all combined for convenience in FIG. 2 in a single block or unit 110, has its input terminals connected to a receiving antenna 111 and its output terminals connected to a first video amplifier 112. The output of video amplifier 112 is coupled through a video decoder 115 to the input terminals of a second video amplifier 116 which in turn has output terminals connected to the input of an image-reproducing device or picture tube 117. Decoding device 115 may be identical in construction to the video coder 11 in the transmitter except that it is controlled to operate in complementary fashion in order to effectively compensate for variations in the timing of the video and synchronizing components of the received television signal. Specifically, when a delay is introduced at the transmitter between the occurrence of a radiated line-drive pulse and the video information occurring during the immediately succeeding line-trace interval, that video signal is translated through decoding device 115 with no delay, whereas when no delay is introduced at the transmitter, a delay is imparted to the video signal in video decoder 115. First video amplifier 112 is also coupled to a synchronizing signal separator which is connected to the usual field-sweep system and line-sweep system connected in turn to the deflection elements (not shown) associated with picture tube 117. For convenience, the combination of the sync separator, and the field- and line-sweep systems have been shown by a single block 119.

Assuming that the illustrated receiver is of the intercarrier type, an intercarrier signal component is derived from first video amplifier 112 and is supplied to a unit limiter and discriminator detector. The output of unit 123 is coupled through a frequency shift audio decoder 124 to an audio amplifier and speaker, combined for illustrative purposes in a single unit 125. Audio decoder 124 may be similar to audio coder 98 in the transmitter except that it is effectively operated in complementary fashion to shift or return the scrambled audio information from the portion of the spectrum which it occupies at the transmitter, back to the original, appropriate location is required to accomplish audio unscrambling.

It is assumed that second video amplifier 116 and the audio amplifier portion of unit 125 each contains a vacuum tube. Filaments for those vacuum tubes, designated by the numerals 128, 129, are respectively shown in units 116, 125. The circuitry for applying heater voltage to those two filaments will be described hereinafter. Suffice it to say at this point that filaments 128 and 129 are not energized until after the correlation test procedure has been completed and it has been positively found that there is a correct condition of correlation between the setting of the code-determining switching apparatus at the receiver and that at the transmitter. With filaments 128 and 129 energized, intelligible reproduction of the video and audio signals is obtained, assuming of course that video decoder 115 is properly operated to decode the video signal.

To facilitate the separation of the code and correlation signal components, and the reset signal components when they are transmitted, from the composite television signal, a monostable multivibrator 132 is connected to the sync separator portion of unit 119 to receive field-drive pulses therefrom and the output of the multivibrator is coupled to one input of an AND gate 133 to supply gating pulses thereto, another input of gate 133 being coupled to an output of first video amplifier 112 to receive the coded composite video signal. Multivibrator 132 is so constructed that each gating pulse is initiated by a field-drive pulse but is not terminated until the field-retrace interval is almost completed in order that the gating pulse will embrace all of the signal bursts of frequencies $f_1$–$f_6$. The output of gate 133 is connected to a series of filter and rectifier units, once again illustrated for convenience as a single block 69. Gate 133 provides the code and correlation signal components, and the reset signal components when present; thus all of the frequencies $f_1$–$f_6$ are delivered to unit 69 at one time or another.

The arrangement of elements 25–83 and 87–93 in FIG. 2 is identical with the arrangement of the correspondingly numbered units in the transmitter of FIG. 1. The only differences are in the actuation of blocking oscillator 25 and in the construction of switching apparatus 80′. While blocking oscillator 25 in the transmitter receives line-drive pulses from the synchronizing signal generator, oscillator 25 in the receiver of FIG. 2 receives line-drive pulses from the line-sweep system of unit 119. Apparatus 80′ differs from apparatus 80 by having two additional output conductors 84 and 85 which are provided to translate the correlation and reset signal components respectively. In other words, while apparatus 80 at the transmitter is capable of selectively connecting any one of the six inputs 71–76 to any one of the three outputs 81–83, apparatus 80′ in the receiver facilitates interconnection between any one of the six inputs 71–76 to any one of the five outputs 81–85. Of course, in order for the receiver to decode the coded television signal transmitted by the transmitter, the setting of apparatus 80′ must agree with the setting of apparatus 80 with respect to the channeling of inputs 71–76 to outputs 81–83. In addiion, apparatus 80′ must also be so adjusted that the rectified pulses of the correlation frequency $f_5$ are channel to output conductor 84 and the rectified pulses of the reset frequency $f_2$ are channel to output conductor 85. In other words, apparatus 80′ must interconnect conductor 75 to conductor 84 and conductor 72 to conductor 85, which is assumed to be the case in the illustrated receiver as evidenced by the frequency designation labels $f_5$ and $f_2$ attached to conductors 84 and 85 respectively.

To achieve correlation tests, output 84 is connected to one input of an AND gate 134, another input of which is connected to the line-sweep system of unit 119 to receive line-drive pulses therefrom. The output of gate 134 is connected to one input of a comparison device in the form of an AND gate 135, another input of which is connected to the output of multivibrator 26 to receive the decoding signal therefrom. If the adjustment of code-determining switching apparatus 80′ in the receiver corresponds to that of switching apparatus 80 in the transmitter, with respect to the channeling of the code signal components to conductors 81–83, the relationship between the decoding signal and the correlation components, developed at the output conductor 84, will be the same at both the transmitter and the receiver. Specifically, the timing of the correlation signal components is arranged at the transmitter so that one such component occurs during each field-retrace interval and at a time when multivibrator 26 is established in a prescribed condition such that its output signal exhibits an amplitude level of a polarity and magnitude sufficient to effectively open gate 135 to gate in the line-drive pulse occurring in time coincidence with the correlation component.

Since the waveshape of the decoding signal produced by multivibrator 26 is influenced by the actual setting of code-determining apparatus 80' at the time, in addition to the random nature of the code signal components applied over input circuits 91–93 of the multivibrator, the decoding signal may be said to have a characteristic determined, at least in part, by the instantaneous adjustment of the code-determining apparatus. Gate 135 constitutes a comparison device which responds to the decoding signal and to the correlation components for effectively comparing the actual adjustment of the code-determining apparatus with a given adjustment, in accordance with which it should be adjusted, to effect a series of correlation tests (one per vertical retrace) to determine if the code-determining apparatus has in fact been properly adjusted by the subscriber. The instants at which the correlation tests are made are determined by the occurrence of the pulses at the output of gate 134. For a properly adjusted receiver, a control pulse will be developed by gate 135 during each field-retrace interval subsequent to the occurrence of the field-drive pulse for that interval. When there is incorrect correlation, the waveform of the decoding signal from multivibrator 26 will not exhibit the required magnitude and polarity at the instants of the correlation components and a pulse will not be developed in the output of gate 135 during each field-retrace interval.

The output terminals of gate 135 connect to an input 136 of a multicondition mechanism in the form of a bistable multivibrator or flip-flop 140 having two stable operating conditions, designated for convenience as the "set" and "reset" conditions respectively. It will be seen that unit 140 effectively indicates the correlation status of apparatus 80'. Hence, it is entitled the "correlator flip-flop. Input 136 is so connected that each time a control pulse is applied over that input the flip-flop is triggered to its set stable operating condition, in the event it is not already established in that condition. For that reason, the label "set" is associated with input 136 in FIG. 2.

Output conductor 85 of apparatus 80' is connected to an input of an AND gate 137 which has another input connected to unit 119 over which line-drive pulses are received. In response to the time coincidence of a rectified pulse of reset frequency $f_2$ and a line-drive pulse, a pulse is produced at the output of gate 137, which output in turn is connected to an input circuit 138 of multistable mechanism 140. Input 138 is so connected that each pulse applied thereover actuates flip-flop 140 to its reset stable operating condition, if it is not already there.

The output terminals of correlator flip-flop 140 are connected to a relay 142, and this connection is so arranged that the relay energizes and remains energized only when the flip-flop is established in its set condition. As will be explained, there wil be a ten-second testing period during which a separate correlation test will be made each vertical-retrace interval. Flip-flop 140 will be reset immediately prior to each correlation test and if the test indicates correct correlation the flip-flop will be triggered to its set condition by a control pulse. Hence, even though the receiver may be properly correlated, flip-flop 140 will still be established in its reset condition for a relatively short time interval immediately preceding each correlation test. However, the construction of relay 142 is such that a time constant is effectively introduced in order that the relay does not become deenergized during that short time interval. In other words, the relay may be made to have a certain degree of inertia so that once energized it does not become deenergized until flip-flop 140 remains in its reset condition for an interval substantially greater than the short interval between reset and set in a properly correlated receiver.

An A.C. voltage source 145 is provided for producing an A.C. voltage of a magnitude suitabel for, inter alia, energizing filaments 128 and 129. For example, if the tubes of the second video amplifier and audio amplifier are of the type requiring 6.3 volts filament voltage, source 145 will be a 6.3 volt source. One output terminal of source 145 is connected to ground while the other is connected to one terminal of the field coil 153 of a timing device in the form of a timer motor assembly 155, the other terminal of the field coil being coupled through the coil 157 of a buzzer assembly 158 to ground. A correlator lamp 161 is coupled in shunt with field coil 153. Timing mechanism 155 has a series of six spring contacts 162–167 which are controlled by a rotatable cam member 168. Cam 168 is spring biased so that it normally assumes its starting or reference position illustrated in FIG. 2. In that condition, all of contacts 162–167 are open with the exception of contacts 164 and 165 which are engaged. Cam 168 holds contact 166 away from contact 167 in the starting condition.

The electrically connected contacts 164 and 165 complete a connection from the output of a differentiator and clipper circuit 139 to a reset input 141 of flip-flop 140. Unit 139, whose input is coupled to the output of multivibrator 132, is so constructed that it produces an output pulse for application to reset input 141 in response to and in time coincidence with the leading edge of each gating pulse applied to AND gate 133. Since each gating pulse starts in response to a field-drive pulse, each reset pulse developed by circuit 139 substantially coincides with the leading edge of a field-drive pulse which, as mentioned previously, occurs prior to the code and correlation signal components during each vertical-retrace interval.

Returning now to timing mechanism 155, when an alternating voltage of the appropriate magnitude is applied to field coil 153, cam 168 begins to rotate in a clockwise direction. After approximately 10° of travel, cam 168 releases contact 166 and its springs into electrical engagement with contact 167. Cam 168 continues to rotate until it reaches a final condition, approximately 90° from its starting point, at which cam 168 moves contacts 162 and 163 together to establish an electrical connection therebetween, while at the same time it disengages contacts 164 and 165. Opening of these contacts is facilitated by an insulated push rod **165*a* attached to the end of contact 165 and which is pushed and moved to the right by contact 162 when cam 168 rotates to its final condition. The time interval required for cam 168 to progress from its starting position, shown in FIG. 2, to its final position 90° away constitutes the correlation testing period of timing cycle and may be made as long or as short as desired. It has been found that a period of ten seconds is adequate, contacts 166 and 167 closing within the first one-half second of the ten-second period. Timing device 155** therefore tolls a ten-second time interval.

Correlator relay 142 controls a movable relay contact 171. When the relay is deenergized , contact 171 is spring biased to engage and make electrical contact with a fixed contact 172. On the other hand, when relay 142 is energized contact 171 is moved into engagement with a contact 173. Movable contact 171 is connected to ground, contact 172 is connected to contact 167 of timer 155, and contact 173 is connected to the three-way junction 174 of field coil 153, buzzer coil 157 and correlator lamp 161.

Contact 162 of timing mechanism 155 is connected to ground, while contact 163 is connected to one side of each of filaments 128 and 129 and also to one input terminal of a charge register 190, the other side of each of the filaments and the other input terminal of unit 190 being connected to the ungrounded output of voltage source 145. The charge register facilitates recording of a separate charge on a recording medium for each program viewed by the subscriber. For example, charge register 190, responsive to actuation, may print a charge on a paper billing tape.

Contact 166 of timer 155 is connected to another reset input, designated by the numeral 143, of flip-flop 140 in order to lock and hold the flip-flop in its reset condition during certain intervals. Specifically, and as will be described subsequently, when input circuit 143 is coupled to ground, flip-flop 140 is triggered to and held in its reset condition which is the condition which effectively represents incorrect correlation. Flip-flop 140 will remain in that reset condition while input 143 is grounded even in the presence of control pulses applied to its input 136; hence, the connection from contact 166 to input 143 is appropriately called a "lock-out" circuit as indicated in FIG. 2.

Consideration will now be given to an explanation of the operation of the described subscription television receiver. When the receiver is initially turned on or energized, A.C. voltage from source 145 is applied to the parallel combination of correlator lamp 161 and field coil 153 which combination is in series with coil 157 of buzzer 158. Neither the field coil nor the correlator lamp will energize with buzzer coil 157 in series therewith, although the buzzer itself energies to provide an audible indication to the subscriber. Assuming that code-determining apparatus 80′ has been properly set up for the program in question, decoding of the received television signal takes place. Specifically, the coded television signal is intercepted by antenna 111, amplified in the radio frequency amplifier in unit 110 and heterodyned to the selected intermediate frequency of the receiver in the first detector. The intermediate frequency signal is amplified in the intermediate frequency amplifier and detected in the second detector to produce a coded composite video signal which is then translated through the cascade arrangement of first video amplifier 112, video decoder 115, and second video amplifier 116 to the input electrodes of image reproducer 117 to control the intensity of the cathode ray beam thereof in conventional manner. Of course, this occurs only after filament 128 of second video amplifier 116 has been energized in a manner to be described. Video unscrambling occurs in complementary fashion to the video coding function in the transmitter and the input electrodes of picture tube 117 are supplied with completely decoded video information. The sweep systems in unit 119 are controlled in conventional manner by the synchronizing signal separator.

The intercarrier sound signal is applied to unit 123 from an output of first video amplifier 112 wherein it is amplified, amplitude limited and demodulated to a scrambled audio signal which takes essentially the same form as that produced in the output of audio coder 98 in the transmitter. The scrambled audio signal is successfully unscrambled in audio decoder 124 by virtue of the fact that the components thereof are returned to their proper positions in the frequency spectrum, and the output of audio decoder 124 effectively constitutes a replica of the original uncoded sound signal. When filament 129 of the audio amplifier in unit 125 is energized, in a manner to be described, this replica is amplified and reproduced in the speaker of unit 125.

Monostable multivibrator 132 responds to field-drive pulses from unit 119 to produce gating pulses each having a duration sufficient to embrace the time interval in which the code and correlation signal components appear during each field-retrace interval, and those components are gated in by gate 133 for application to filter and rectifier units 69. Since code-determining switching apparatus 80′ in the receiver is positioned in accordance with the same setting as the corresponding switching apparatus in the transmitter, units 25–83 and 87–93 operate in the same manner as described in connection with the identically numbered elements in the transmitter so that receiver decoding is in synchronism with transmitter coding. In this way, the rectangular shaped coding signal developed in the output of multivibrator 26 and used for actuating video decoder 115 has a waveform identical to that of the coding signal applied to video coder 11.

In order to make a determination as to the correctness of the setting of code-determining apparatus 80′, differentiator and clipper 139 produces from each gating pulse, developed by multivibrator 132, a reset pulse occurring substantially in time coincidence with the leading edge of each field-drive pulse, and each of these reset pulses is applied to input 141 of flip-flop 140 via contacts 164 and 165 which are now in engagement. Flip-Flop 140 therefore triggers to its reset condition in response to the leading edge of each field-drive pulse. Since each correlation pulse occurs during a field-retrace interval but subsequent to the field-drive pulse during that interval, flip-flop 140 will be established in its reset condition immediately prior to each correlation test. Each correlation burst of frequency $f_5$ is channeled through apparatus 80′ to gate 134 wherein it gates into gate 135 the line-drive pulse occurring in coincidence therewith. Inasmuch as the receiver is properly adjusted, the timing of the line-drive pulses selected by gate 134 are correlated with the decoding signal produced in the output of multivibrator 26 such that the decoding signal has a magnitude and polarity at the instants of the correlation pulses appropriate to effectively turn gate 135 on and translate those line-drive pulses to correlator flip-flop 140. Each control pulse from gate 135, and there will be only one per field-trace interval, actuates correlator flip-flop 140 from its reset condition (to which it was actuated by unit 139) to its set condition in which it remains until just prior to the next correlation test which occurs during the succeeding field-retrace interval.

Of course, if switching apparatus 80′ is not adjusted in conformity to the adjustment at the transmitter, a correlation control pulse will not be translated through gate 135 to flip-flop 140 during each field-retrace interval, since multivibrator 26 has only a fifty-fifty chance of being in the appropriate condition at the occurrence of the correlation pulses. When properly correlated, however, flip-flop 140 will be established in its set condition, except for those brief intervals between each field-drive pulse and the immediately succeeding correlation test. As mentioned previously, correlator relay 142 remains continuously energized when the receiver is properly correlated.

In response to the initial energization of correlator relay 142, movable contact 171 actuates to establish an electrical connection with fixed contact 173 in order to apply ground to junction 174 of buzzer coil 157, correlator lamp 161 and field coil 153. The buzzer coil thus shorts out so that it no longer operates. Since coil 157 is no longer in series with the parallel combination of lamp 161 and field coil 153, both of those elements will be energized by source 145. Illumination of the correlator lamp provides a visual indication to the subscriber that his code-determining apparatus apparently has been properly set up.

Energization of field coil 153 initiates clockwise rotation of cam 168 of timer 155. As cam 168 leaves its starting position shown in FIG. 2, contacts 166 and 167 immediately close. Preferably, these contacts should close within a half second of the initial rotation of cam 168. So long as correlator relay 142 remains energized while cam 168 progresses during the testing period, the closing of contacts 166 and 167 has no effect. However, it is desirable that any failure of a correlation test during the ten-second testing period cause the return of timer 155 to its starting condition. The closing of contacts 166 and 167 for the lockout circuit insures that this will happen.

To explain, a mechanically driven timing device, such as that shown in the illustrated embodiment, usually requires an absence of energization for a minimum duration in order for the spring bias to fully return the mechanism to its starting condition. If it happens that code-determining switching apparatus 80' is incorrectly positioned but yet is so adjusted that most but not all of its input and output conductors are properly permuted, most of the correlation tests during a ten-second interval may prove successful, even though exact correlation does not in fact prevail. In that event, the first failure during the test period results in the absence of a control pulse during a field-retrace interval at the output of gate 135. Hence, flip-flop 140 remains in its reset condition, to which it was actuated by a reset pulse from unit 139, for at least the succeeding field-trace interval. Correlator relay 142 therefore deenergizes and movable contact 171 falls back to contact 172, removing ground from junction 174 and placing it on closed contacts 166 and 167. Buzzer 158 energizes again and correlator lamp 161 extinguishes to provide the subscriber with an indication that correlation has been lost. Ground is now placed on reset input 143 of flip-flop 140 to lock the flip-flop in its reset condition. In this way, so long as ground is maintained on input 143, relay 142 will not energize causing field coil 153 to remain deenergized. The spring bias on timing mechanism 155 is thus permitted to return the timer all the way to its starting condition. This lockout arrangement consequently insures that any single interruption of the energization of timer 155 during the ten-second timing cycle endures for at least the minimum duration required for the timing mechanism to return to its starting condition.

In the absence of this feature, it is possible that occasional correlation test failures would only result in arresting the progress of cam 168 or, alternatively, result in slipping back of cam 168 such that eventually the cam rotates or progresses to its final condition. Thus, it would be possible by an accumulation process, occurring during an interval longer than ten seconds, for timer 155 to reach its final condition. As will be described presently, it is desired that the operations that take place after timer 155 reaches its final condition should not occur in a receiver which is not properly adjusted.

Since apparatus 80' is properly correlated with apparatus 80, relay 142 remains energized throughout the entire ten-second testing period and in that period cam 168 progresses all the way to its final condition at which instant contacts 162 and 163 are brought together to engage, while at the same time contacts 164 and 165 become disengaged. Ground on contact 162 is therefore extended via contact 163 to one input terminal of charge register 190 and to one side of each of filaments 128 and 129. Voltage from source 145 is thus impressed across the input terminals of charge register 190 to effect actuation thereof, thereby to achieve charge recording. Voltage from source 145 is also now applied across each of filaments 128 and 129 to effect energization thereof. Of course, the second video amplifier and the audio amplifier may be combined in a single twin tube, in which case only a single filament need be energized. In any event, when these filaments heat up in response to the potential from source 145, video amplifier 116 and the audio amplifier portion of unit 125 become operable. The decoded video signal is thus extended to picture tube 117 while the unscrambled audio signal is extended to the speaker of unit 125. Thus, both the video and audio signals are intelligibly reproduced.

As explained, a special provision is made to insure that timer 155 returns to its starting condition if there is only a single correlation test failure during the ten-second testing period to make absolutely certain that apparatus 80' is correctly adjusted to the prescribed setting for the program under consideration before a charge is recorded and the video and audio signals are extended to the picture tube and speaker, respectively. Of course, momentary interruptions of the code and correlation signal components as a result of transmitter error, impulse noise, air plane flutter, signal fading, etc., occurring during the ten-second testing period also result in the deenergization of correlator relay 142 with the consequent return of timer 155 to its starting condition even though switching apparatus 80' may be correctly positioned. Under such circumstances, the completion of the correlation testing procedure will be delayed slightly. For example, if air plane flutter results in deenergization of relay 142 after only eight seconds of the testing period, timer 155 returns to its starting condition so that another ten seconds is required before it may reach its final condition. Thus, eighteen seconds would be required to effectively perform a sufficient number of correlation tests to make a conclusive determination that the code-determining apparatus is correctly set.

While such a loss of correlation is not objectionable during the correlation testing period, it is desirable that any such loss should be avoided after the testing period has been completed and the audio and video channels have been effectively rendered operable. Otherwise, video and sound may be momentarily lost with each correlation loss which, of course, is most undesirable. It is preferred that once an initial ten-second testing period has positively confirmed that correct correlation exists, relay 142 remains energized to prevent a loss of video and audio even though the code and correlation signal components are interrupted for a relatively long time interval. This is achieved in accordance with the present invention.

When timer 155 reaches its final condition contacts 164 and 165 open to prevent the application of reset pulses from differentiator and clipper 139 to input 141 of flip-flop 140. As a consequence, only set pulses from gate 135 will be applied to flip-flop 140. It will therefore remain in its set condition and relay 142 will remain energized throughout the program interval. If there is an interruption of the code or correlation signal components, be it momentary or for a sustained period, set pulses will not be produced by gate 135 for application to the flip-flop. This will be of no concern, however, since the flip-flop will nevertheless remain in its set stable operating condition. In other words, once the correlation testing circuitry has found that correct correlation prevails and timer 155 has run up to its final condition, flip-flop 140 will remain in its set condition and relay 142 will remain energized even in the absence of set pulses for an indefinite time.

At the conclusion of the program in question it is desired that flip-flop 140 be actuated to its reset condition so that relay 142 will deenergize thereby to cause timing mechanism 155 to return to its starting condition. This is achieved by means of signal bursts of the reset frequency, $f_2$ for the example considered. Accordingly, at the end of the program the operator at the transmitter will manipulate switch 60 to its position in which contacts 63 and 64 engage. The code and correlation signal components will thus no longer be conveyed to the mixer 13 and instead they will be replaced by a series of signal bursts of frequency $f_2$ developed in the output of timing circuitry 65 during each vertical-retrace interval. At the receiver, the $f_2$ reset bursts will be channeled through apparatus 80' to output conductor 85 and thence to an input of gate 137 to effectively turn that gate on during the line-drive pulses that occur in time coincidence therewith. The line-drive pulses gated in by the rectified pulses of frequency $f_2$ are translated to input 138 of flip-flop 140 to reset the flip-flop to its reset condition. Of course, actually only a single $f_2$ burst is needed to effect reset but a series of such reset bursts are employed to make absolutely certain that at least one of them achieves reset.

In the event that the subscriber tunes his subscription television receiver to another channel, to receive a non-subscription telecast, before the conclusion of the subscription program under consideration, flip-flop 140 may remain in its set condition and timer 155 in its final condition. If the receiver is then tuned to a channel carrying another subscription telecast or back to the same channel, which carried the subscription program considered, to receive a subsequent subscription program, flip-flop 140 will be reset to its reset condition unless apparatus 80' is properly adjusted for the second program. This occurs because the second program will require a different adjustment of apparatus 80', and preferably a different frequency will be selected for reset. Thus, $f_2$ signal bursts will be code components and will effect the application of pulses over input 138 of flip-flop 140 to actuate the flip-flop to its reset condition and thereby to deenergize relay 142 to restore timer 155 to its starting condition.

To summarize the invention in accordance with one of its aspects, a subscription television receiver is provided to which is transmitted a coded television signal for a specified subscription television program. The receiver comprises code-determining apparatus 80' which must be adjusted by the subscriber in accordance with a given adjustment before the coded television signal may be decoded and intelligibly reproduced. Flip-flop 140 constitutes a multistable mechanism having set and reset stable operating conditions. AND gates 134 and 135 provide correlation testing means coupled to code-determining apparatus 80' and to multistable mechanism 140 for performing, during each of a series of time spaced testing intervals (namely during each field-retrace interval), a correlation test to determine if the code-determining apparatus has in fact been properly positioned by the subscriber to the given adjustment and for actuating the multistable mechanism, responsive to each correlation test which indicates correct correlation between the given adjustment and the actual adjustment of the code-determining apparatus at the time, to its set condition in the event the mechanism is not already established therein. Differentiator and clipper 139, contacts 164 and 165 and the associated circuitry constitute reset means for actuating multistable mechanism 140, prior to each of at least some of the testing intervals, to its reset condition in the event the mechanism is not already established therein. Relay 142 and its associated contacts, and timing mechanism 155 primarily provide control means coupled to the correlation testing means and responsive to an indication of correct correlation in each of several consecutive correlation tests for effectively disabling the reset means (by opening contacts 164 and 165) to prevent resetting of multistable mechanism 140 by the reset means subsequent to the occurrence of those several consecutive tests.

Viewing the invention from a different aspect, a subscriber communication system is provided which includes a transmitter for transmitting an intelligence signal (namely a coded television signal) and a receiver for receiving the intelligence signal. The receiver comprises an adjustable apparatus 80' to be established by the subscriber in a predetermined condition of adjustment. Multistable mechanism 140 has set and reset conditions and it must be established and substantially remain in its set condition to effect utilization of the intelligence signal. Gates 134 and 135, relay 142 and its associated contacts, and timer 55 primarily provide means at least partially responsive to the establishment of apparatus 80' in the predetermined condition of adjustment for actuating multistable mechanism 140 to its set condition and for retaining the mechanism substantially in that set condition thereby to enable the receiver to utilize the intelligence signal. AND gate 137 and its associated circuitry constitute means adapted to be remotely controlled from the transmitter for resetting multistable mechanism 140 to its reset condition.

While a particular embodiment of the invention has been shown and described, modifications may be made, and it is intended in the appended claims to cover all such modifications as may fall within the true spirit and scope of the invention.

I claim:

1. A subscriber communication receiver for utilizing a received intelligence signal, comprising:

an adjustable apparatus to be established in a predetermined condition of adjustment to effect utilization of said intelligence signal;

a multicondition mechanism having set and reset operating conditions;

correlation testing means coupled to said adjustable apparatus and to said multicondition mechanism for performing a series of time spaced correlation tests to determine if said apparatus has in fact been properly positioned to said predetermined condition of adjustment and for actuating said multicondition mechanism, responsive to each correlation test which indicates correct correlation between said predetermined condition of adjustment and the actual condition of said apparatus at the time, to its set condition in the event said mechanism is not already established therein;

reset means for actuating said multicondition mechanism, during each of a series of time spaced intervals intervening said series of correlation tests, to its reset condition in the event said mechanism is not already established therein;

and control means, coupled to said correlation testing means and operable after a number of said tests have indicated correct correlation, for effectively disabling said reset means to prevent resetting of said multicondition mechanism by said rest means.

2. A subscriber communication receiver according to claim 1 and including means, independent of said reset means and adapted to be actuated subsequent to the disabling of said reset means, for resetting said multicondition mechanism to its reset condition.

3. A subscriber communication receiver according to claim 1 wherein said control means includes a timing device for tolling a given time interval embracing several correlation tests, said reset means being disabled at the conclusion of said given time interval.

4. A subscription television receiver to which is transmitted a coded television signal comprising:

code-determining apparatus which must be adjusted by the subscriber in accordance with a given adjustment before said coded television signal may be decoded and intelligibly reproduced;

a multistable mechanism having set and reset stable operating conditions;

correlation testing means coupled to said code-determining apparatus and to said multistable mechanism for performing, during each of a series of time spaced testing intervals, a correlation test to determine if said code-determining apparatus has in fact been properly positioned by the subscriber to said given adjustment and for actuating said multistable mechanism, responsive to each correlation test which indicates correct correlation between said given adjustment and the actual adjustment of said code-determining apparatus at the time, to its set condition in the event said mechanism is not already established therein;

reset means for actuating said multistable mechanism, prior to each of at least some of said testing intervals, to its reset condition in the event said mechanism is not already established therein;

and control means coupled to said correlation testing means and responsive to an indication of correct correlation in each of several consecutive correlation tests for effectively disabling said reset means to prevent resetting of said multistable mechanism by said reset means subsequent to the occurrence of those several consecutive tests.

5. A subscription television receiver according to claim 4 in which said multistable mechanism has a plurality of input circuits, and wherein said correlation testing means develops and applies a control signal over one of said input circuits in response to each test indicating correct correlation to actuate said multistable mechanism to its set condition, said reset means developing and applying a reset signal over another of said input circuits prior to each of at least some of said testing intervals to actuate said multistable mechanism to its reset condition.

6. A subscription television receiver according to claim 4 wherein said correlation testing means develops a control signal during each correlation test in which the setting of said code determining apparatus corresponds to said given adjustment, and wherein said control means responds to the presence of control signals in all of said several consecutive tests for disabling said reset means.

7. A subscription television receiver according to claim 4 in which said control means responds only to an indication of correct correlation in all of a predetermined number of said correlation tests for subsequently disabling said reset means.

8. A subscription television receiver according to claim 4 in which said control means includes timing means responsive to an indication of correct correlation in all of said several consecutive tests for progressing from a starting condition to a final condition, said reset means being disabled when said timing means reaches its final condition.

9. A subscription television receiver according to claim 4 in which said coded television signal is for a specified subscription television program and including means adapted to be remotely controlled at the conclusion of said specified subscription television program for resetting said multistable mechanism to its reset condition.

10. A subscription television system including a receiver according to claim 4 and a transmitter for transmitting said coded television signal, for a specified subscription television program, to said receiver, said transmitter comprising means, adapted to be operated at the conclusion of said subscription television program, for transmitting a control signal to said receiver, said receiver including means responsive to said control signal for resetting said multistable mechanism to its reset condition.

11. A subscription television receiver according to claim 4 in which said coded television signal includes field-synchronizing components occurring during respective field-retrace intervals, each of said correlation tests also occurring during a respective one of said field-retrace intervals but subsequent to the field-synchronizing component for that interval, and wherein said reset means utilizes said field-synchronizing components to reset said multistable mechanism.

12. A subscriber communication receiver to which is transmitted an intelligence signal, comprising:

an adjustable apparatus to be established by the subscriber in a predetermined condition of adjustment;

correlation testing means coupled to said adjustable apparatus for performing a series of time spaced correlation tests to determine if said apparatus has in fact been properly positioned to said predetermined condition of adjustment;

enabling means, coupled to said correlation testing means and operable after a number of said tests have indicated correct correlation between said predetermined condition of adjustment and the actual condition of said apparatus at the time, for enabling said receiver to utilize said intelligence signal;

and means responsive to the operation of said enabling means for effectively rendering said correlation testing means ineffective.

References Cited

UNITED STATES PATENTS 3,244,806 4/1966 Morris ------------- 178—5.1
3,249,689 5/1966 Davis -------------- 178—5.1

RODNEY D. BENNETT, Jr., Primary Examiner

M. F. HUBLER, Assistant Examiner